US008101320B2

(12) United States Patent
Skala (10) Patent No.: US 8,101,320 B2
(45) Date of Patent: Jan. 24, 2012

(54) FUEL CELL INTEGRATED HUMIDIFICATION

(75) Inventor: Glenn W. Skala, Churchville, NY (US)

(73) Assignee: GM Global Technology Operations LLC, Detroit, MI (US)

(*) Notice: Subject to any disclaimer, the term of this patent is extended or adjusted under 35 U.S.C. 154(b) by 1172 days.

(21) Appl. No.: 11/358,356

(22) Filed: Feb. 21, 2006

(65) Prior Publication Data

US 2007/0196720 A1    Aug. 23, 2007

(51) Int. Cl.
*H01M 8/04*    (2006.01)
*H01M 8/24*    (2006.01)
*H01M 2/02*    (2006.01)

(52) U.S. Cl. ......... 429/512; 429/456; 429/457; 429/514

(58) Field of Classification Search ............ 429/13, 429/17, 19–20, 22, 26, 34–35, 38–39, 408, 429/413–415, 420, 427–429, 440, 443–444, 429/448–449, 452, 545, 456–458, 463, 465, 429/467–469, 471, 479–480, 482–483, 490, 429/492, 507–509, 512–516, 535; 210/234, 210/767; 427/115; 521/25
See application file for complete search history.

(56) References Cited

U.S. PATENT DOCUMENTS

| 4,175,165 | A | 11/1979 | Adlhart |
| 4,769,297 | A | 9/1988 | Reiser et al. |
| 4,973,530 | A | 11/1990 | Vanderborgh et al. |
| 5,543,238 | A | 8/1996 | Strasser |
| 6,451,466 | B1 | 9/2002 | Grasso et al. |
| 6,471,195 | B2 | 10/2002 | Shimanuki et al. |
| 6,630,260 | B2 | 10/2003 | Forte et al. |
| 6,821,661 | B2 * | 11/2004 | Haridoss et al. ............... 429/13 |
| 2004/0137298 | A1 * | 7/2004 | Sugiura et al. ................ 429/32 |
| 2004/0241020 | A1 * | 12/2004 | Hobmeyr et al. ........ 417/423.11 |
| 2006/0008695 | A1 * | 1/2006 | Bai et al. ........................ 429/38 |
| 2006/0134487 | A1 * | 6/2006 | Wang et al. .................... 429/30 |

FOREIGN PATENT DOCUMENTS

JP    2005267958 A    9/2005

* cited by examiner

*Primary Examiner* — Barbara Gilliam
*Assistant Examiner* — Claire L Roe
(74) *Attorney, Agent, or Firm* — Dinsmore & Shohl LLP (57) ABSTRACT

A device and method to extract water from a moisture-rich fuel cell flowpath to supply other components of a fuel cell system that require water. A water transport unit is integrated into the fuel cell so that the size, weight and complexity of a fuel cell is minimized. In one embodiment, the device includes numerous flowpaths that include an active region and an inactive region. The water transport unit includes a moisture-donating fluid channel and a moisture-accepting fluid channel, where the latter is fluidly connected with a portion of the fuel cell that is in need of humidification. Upon passage of a moisture-donating fluid through the inactive region of the device flowpath, at least some of the water contained therein passes through the water transport unit to a portion of the fuel cell that is in need of humidification.

12 Claims, 8 Drawing Sheets

FUEL CELL INTEGRATED HUMIDIFICATION

BACKGROUND OF THE INVENTION

The present invention relates generally to ways to increase humidification of fuel cell reactants, and more particularly to ways to integrate water transfer functions into anode or cathode flowfield plates to facilitate such humidification.

In many fuel cell systems, hydrogen or a hydrogen-rich gas is supplied through a flowpath to the anode side of a fuel cell while oxygen (such as in the form of atmospheric oxygen) is supplied through a separate flowpath to the cathode side of the fuel cell. An appropriate catalyst (for example, platinum) ionizes the hydrogen into a proton and electron on the anode side such that upon subsequent combination of the proton with oxygen and the electrons at the cathode side, electric current is produced with high temperature water vapor as a reaction byproduct.

In one form of fuel cell, called the proton exchange membrane (PEM) fuel cell, an electrolyte in the form of a membrane is sandwiched between two electrode plates (typically in the form of a porous diffusion media) that make up the anode and cathode. This layered structure is commonly referred to as a membrane electrode assembly (MEA), and forms a single fuel cell. Many such single cells can be combined to form a fuel cell stack, increasing the power output thereof. While the present invention is especially applicable to the PEM fuel cell, it will be appreciated by those skilled in the art that the use of other fuel cell configurations with the present invention is also within the purview of the present disclosure.

Fuel cells, particularly PEM fuel cells, require balanced water levels to ensure proper operation. For example, it is important to avoid having too much water in the fuel cell, which can result in the flooding or related blockage of flowfield channels, thereby preventing the flow of reactants. Contrarily, too little hydration limits electrical conductivity of the membrane and can lead to premature cell failure. Exacerbating the difficulty in maintaining a balance in water level is that there are numerous conflicting reactions taking place in a fuel cell that are simultaneously increasing and decreasing local and global hydration levels. In addition to the flooding mentioned above, water can be dragged from the anode and into the cathode by the ionized protons moving from the anode. This phenomenon, known as electro-osmotic drag, significantly contributes to the removal of water molecules from the anode. Other mechanisms may also be prevalent, including diffusion of water molecules from the cathode to the anode across the membrane due to pressure differences.

Furthermore, many of these effects are localized such that even if global levels of hydration are maintained in the fuel cell, there is no guarantee that local water balance is maintained. One potential method of ensuring adequate levels of hydration throughout the fuel cell includes humidifying one or both of the reactants before they enter the fuel cell. For example, the water produced at the cathode can be used, with appropriate humidification devices, to reduce the likelihood of anode or membrane dehydration. These humidification devices can involve either external supply means (for example, a separate water reservoir) or self-supply means, such as a water vapor transfer device that extracts the moisture from a humid fuel cell exhaust flowpath and places it into a reactant feed path.

Unfortunately, the use of humidification devices (and their supporting control systems) necessitates additional fuel cell system weight, size and complexity, as well as reductions in fuel cell output or efficiency in situations where such componentry requires a source of power to operate. Such disadvantages are especially troublesome for vehicle-based fuel cell applications, as the often redundant componentry would take up precious vehicle space otherwise used for passenger, comfort or safety features. Accordingly, there exists a need for an integrated approach to hydrating a fuel cell to avoid the cost, complexity or operability associated with traditional approaches.

BRIEF SUMMARY OF THE INVENTION

These needs are met by the present invention, wherein an electrochemical conversion assembly (such as a fuel cell system) and a method of operating the assembly that incorporates the features discussed below is disclosed. In the present context, the term "fuel cell" may refer to a single cell for the electrochemical conversion of an oxidant and a reductant to electricity, or to numerous such cells in a stack or related configuration to allow a series connection of the cells and a concomitant increase in voltage output.

In accordance with a first aspect of the present invention, a fuel cell assembly includes at least one fuel cell with an anode, a cathode, reactant flowpaths and a water transport unit placed adjacent a portion of one of the flowpaths to permit an exchange of moisture between them. A portion of the flowpaths are in fluid communication with the anode, while another portion are in fluid communication with the cathode. At least one of the flowpaths define an active region and an inactive region, where the first generally corresponds to a location on the anode or cathode where an electrochemical reaction of one or both of the reactants (such as oxygen and hydrogen from the fluids) takes place, while the second is where little or no electrochemical reaction takes place. One way to distinguish between the active and inactive regions is the inclusion of a catalyst on the former but not the latter. The water transport unit is used in the inactive region to extract water from a moisture-rich fuel cell flowpaths and reintroduce it (typically in vapor form) into a low moisture (or no moisture) fuel cell flowpath. The device includes a moisture-donating fluid channel separate from a moisture-accepting fluid channel. The first of these is in fluid communication with at least one moisture-rich flowpath, while the second is in fluid communication with a portion of the fuel cell that is in need of humidification. In the present context, a moisture-rich flowpath is one that contains an excess of moisture in the form of liquid, vapor or a combination of the two. The moisture-accepting fluid channel cooperates with the moisture-donating fluid channel such that upon passage of a moisture-donating fluid through the latter, at least some of the water contained therein passes to the former and to the portion of the fuel cell that is in need of humidification.

Optionally, the active region may define a substantial center of the at least one fuel cell. In one form, the active region may be surrounded by split inactive regions, while in another, it can be divided from the inactive region by a station line. In either event, it is the use of an electrolyte in the MEA that separates the active region from the inactive region, as the latter preferably only includes a hydrophilic diffusion media in place of the electrolyte. Furthermore, the anode flowpath and the cathode flowpath are in substantial counterflow relationship with one another. In addition, the assembly further includes flow headers disposed at opposing ends of the plurality of flowpaths. In one form, the headers define inlet and outlet manifolds for cathode flowpaths, anode flowpaths and coolant flowpaths, where the coolant flowpath is placed adjacent at least one of the anode and the cathode so that heat exchange between the coolant and the adjacent anode takes place. The moisture-donating fluid channel and the moisture-accepting fluid channel can be arranged in substantial counterflow relationship with one another to maximize moisture transfer. The moisture-donating fluid channel and the moisture-accepting fluid channel are preferably in a thin-film form, so that they do not appreciably increase the thickness of the fuel cell. For example, the thin-film form may resemble a gasket-like structure that is placed between the anode and cathode layers. In this way, the thin-film form of the water transport unit resembles a sandwich or laminated structure. Regardless of the configuration, the hydrophilic nature of the configuration promotes the capillary action of moisture from the moisture-donating film layer to the moisture-accepting film layer. The moisture-donating fluid channel and the moisture-accepting fluid channel are preferably separated by a moisture-permeable membrane, where at least one side of the moisture-permeable membrane is substantially covered with a hydrophilic diffusion media. This allows the media to act as a wick to pull liquid water from the appropriate anode or cathode flowpath, which helps in keeping the flowpaths clear of liquid water build-up. It additionally creates a water buffer that can be beneficial in operational transients.

In another option, the moisture-donating fluid channel is fluidly coupled to the cathode flowpaths. This permits an exhaust fluid produced at the cathode to flow through the moisture-donating fluid channel, giving up at least a portion of its water. This embodiment may be particularly useful in a fuel cell system where the anode flow takes place in a single pass (i.e., that has no anode recirculation). In a more particular option, the moisture-accepting fluid channel is fluidly coupled to the anode flowpaths. Thus, upon receipt of water from the moisture-donating fluid channel, the moisture-accepting fluid channel can convey that water to the hydrogen-bearing fluid, which can in turn be conveyed to the anode. In yet another option, a vehicle may include the fuel cell assembly, which serves as a source of motive power for the vehicle. Examples of such vehicles include (but are not limited to) automobiles, trucks, buses, aircraft, watercraft, spacecraft and motorcycles.

According to another aspect of the invention, a flow field plate for a fuel cell assembly is disclosed. The plate includes a reactant flowpath formed in a surface of the plate, a frame substantially circumscribing the flowpath, one or more flow headers disposed between the frame and the flowpath and a water transport unit. The reactant flowpath includes active and inactive regions similar to that described in the previous aspect. The flow header is placed between the frame and the reactant flowpath, and is adjacent the inactive region such that moisture in one can be exchanged to the other. The water transport unit is similar to that previously described, so that one or more portions of a fuel cell in need of humidification can receive it.

Optionally, the plate is made up of numerous plates fastened together, including at least an anode plate and a cathode plate. In a preferred form, the anode and cathode plates form a bipolar plate. The plate may also include at least one cooling flowpath to assist in transferring heat to or from the plate. In another option, the water transport unit is disposed between the anode and cathode such that together they define a substantially laminated structure. In the present context, the term "laminated" merely refers to the generally sandwich-like construction between the water transport unit and the electrodes it is placed between; it is not meant to imply that conventional laminate bonding or adhesive approaches are required in order to ensure the continuity of such structure. By way of further option, the water transport unit can be dimensioned such that it acts as a gasket when placed within the frame. In this way, the device is a thin-plate-like member that can be sandwiched in between the various anodes or cathodes.

According to another aspect of the invention, a method of operating a fuel cell is disclosed. The method includes combining reactants in an electrochemical conversion reaction to produce an electric current and water, and conveying at least some of the water through a water transport unit that is coupled to the fuel cell such that water can be exchanged between the water transport unit and the fuel cell. The fuel cell includes one or more plates (where multiple plates define a stack) making up an anode and its associated flowpath, a cathode and its associated flowpath, an electrolyte disposed between the anode and the cathode, and the aforementioned water transport unit. The water transport unit includes first and second portions in a manner similar to that described previously.

Preferably, the flowpath that is in fluid communication with the first portion of the water transport unit includes an active region and an inactive region, both substantially similar to that described in one or more of the previous aspects. In a particular option, the first portion of the water transport unit is in fluid communication with the cathode and the cathode flowpath such that upon operation of the fuel cell, a water-bearing exhaust fluid is conveyed from the cathode and cathode flowpath through the first portion of the water transport unit.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
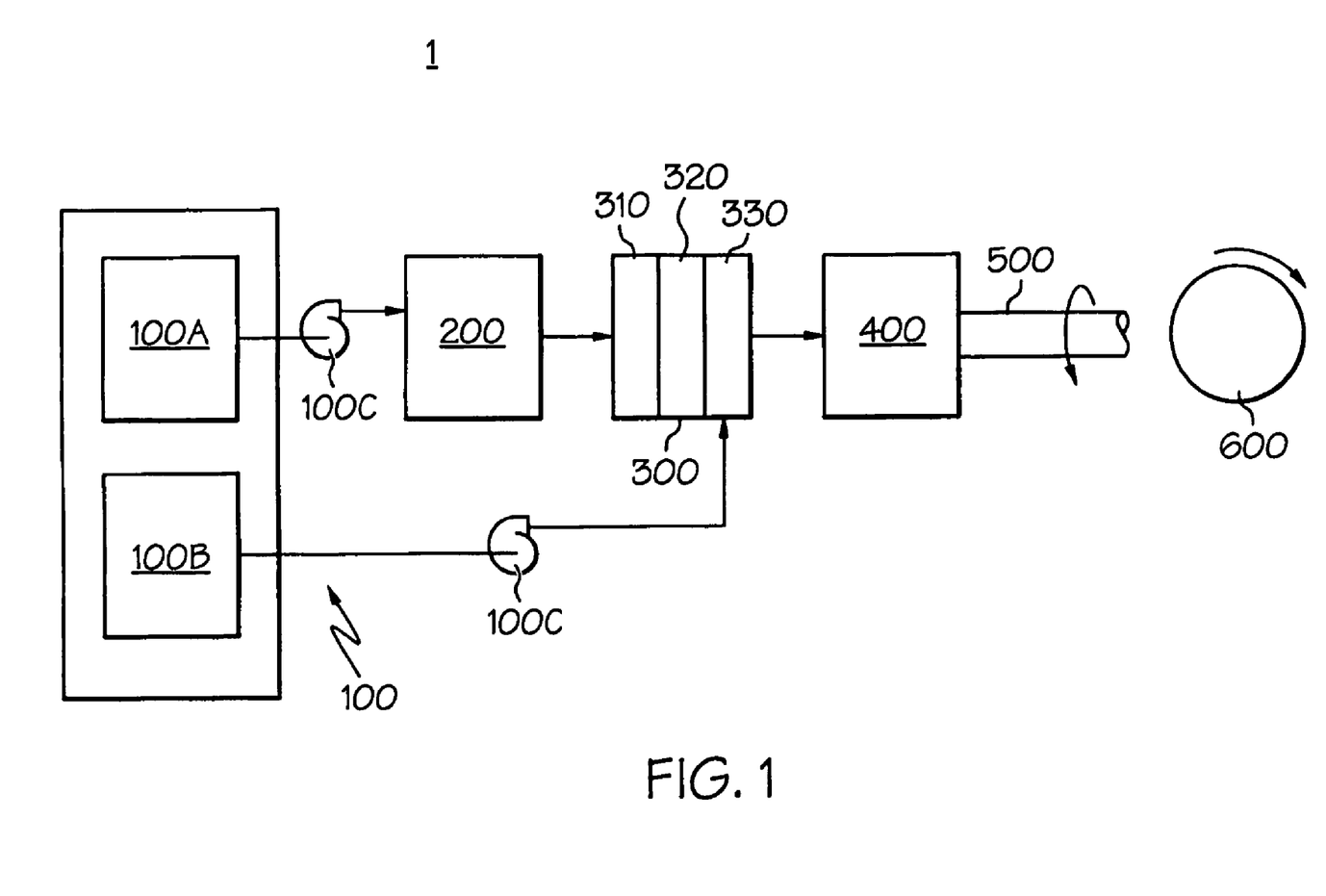
FIG. 1 shows a block diagram of a fuel cell system configured for vehicular application.
Figure 5:
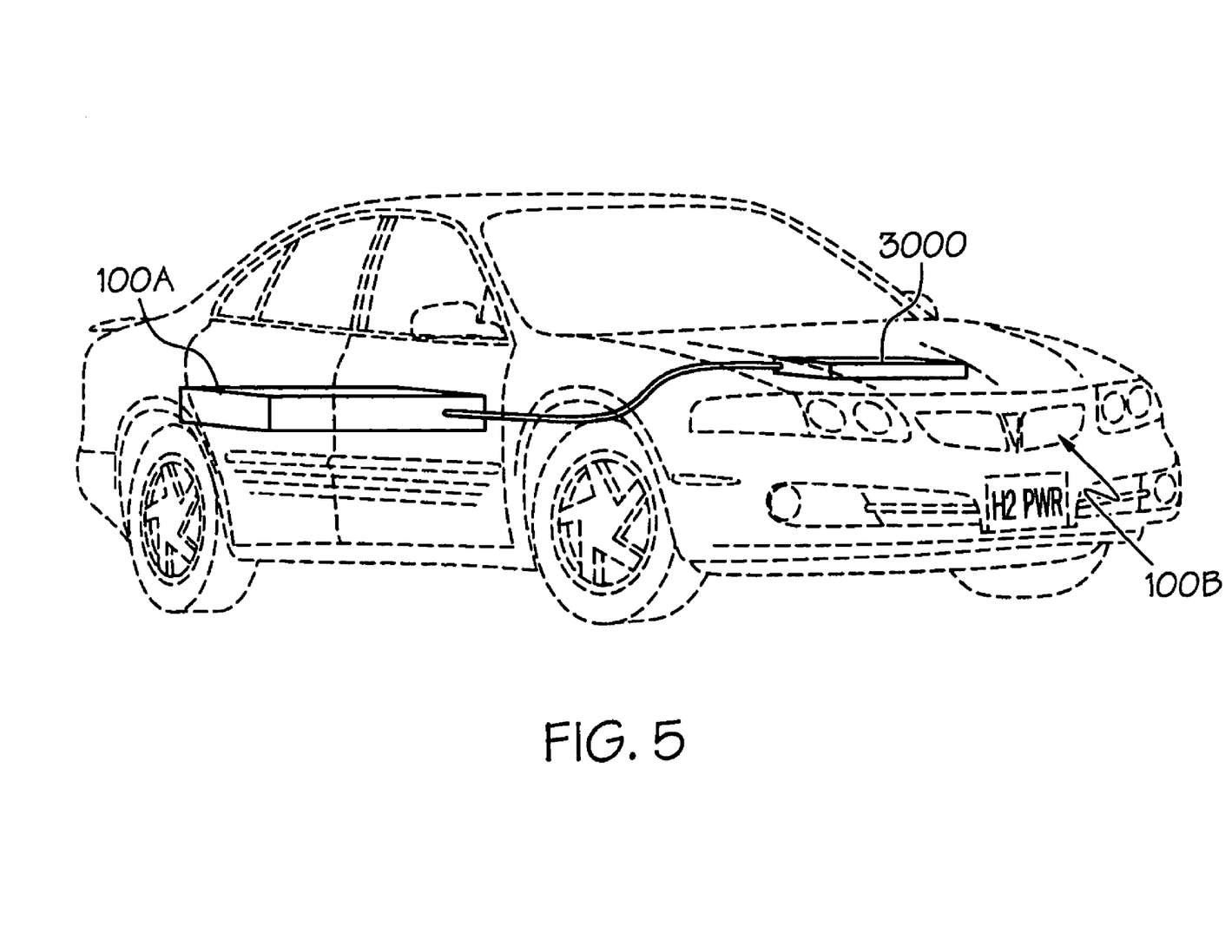
FIG. 5 shows a vehicle employing the fuel cell system of the present invention.

Referring initially to FIGS. 1 and 5, a block diagram highlights the major components of a mobile fuel cell system 1 according to the present invention (FIG. 1), as well as a representative placement of a fuel cell system into an automotive application (FIG. 5). Referring with particularity to FIG. 1, the system 1 includes a reactant delivery system 100 (made up of fuel source 100A, oxygen source 100B and one or more compressors 100C), fuel processing system 200, fuel cell 300, one or more energy storage devices 400, a drivetrain 500 and one or more motive devices 600, shown notionally as a wheel. Fuel cell 300 includes an anode 310, cathode 330, and an electrolyte layer 320 disposed between anode 310 and cathode 330. It will be appreciated by those skilled in the art that not every system may require a compressor. For example, in configurations where one or both of the fuel or oxygen sources 100A, 100B are supplied via pressurized tank or related container, such compressors may be dispensed with. While the present system 1 is shown for mobile (such as vehicular) applications, it will be appreciated by those skilled in the art that the use of the fuel cell 300 and its ancillary equipment is equally applicable to stationary applications. Although only a single fuel cell 300 is shown in FIG. 1, it will be appreciated by those skilled in the art that fuel cell system 1 may be made from a stack of such cells serially connected. Referring with particularity to FIG. 5, the use of such a stack 3000 is especially relevant to vehicular and related applications.

The fuel processing system 200 may be incorporated to convert a raw fuel, such as methanol into hydrogen or hydrogen-rich fuel for use in fuel cell 300; otherwise, in configurations where the fuel source 100A is already supplying substantially pure hydrogen, the fuel processing system 200 may not be required. The energy storage devices 400 can be in the form of one or more batteries, capacitors, electricity converters, or even a motor to convert the electric current coming from the fuel cell 300 into mechanical power such as rotating shaft power that can be used to operate drivetrain 500 and one or more motive devices 600.

Figure 2:
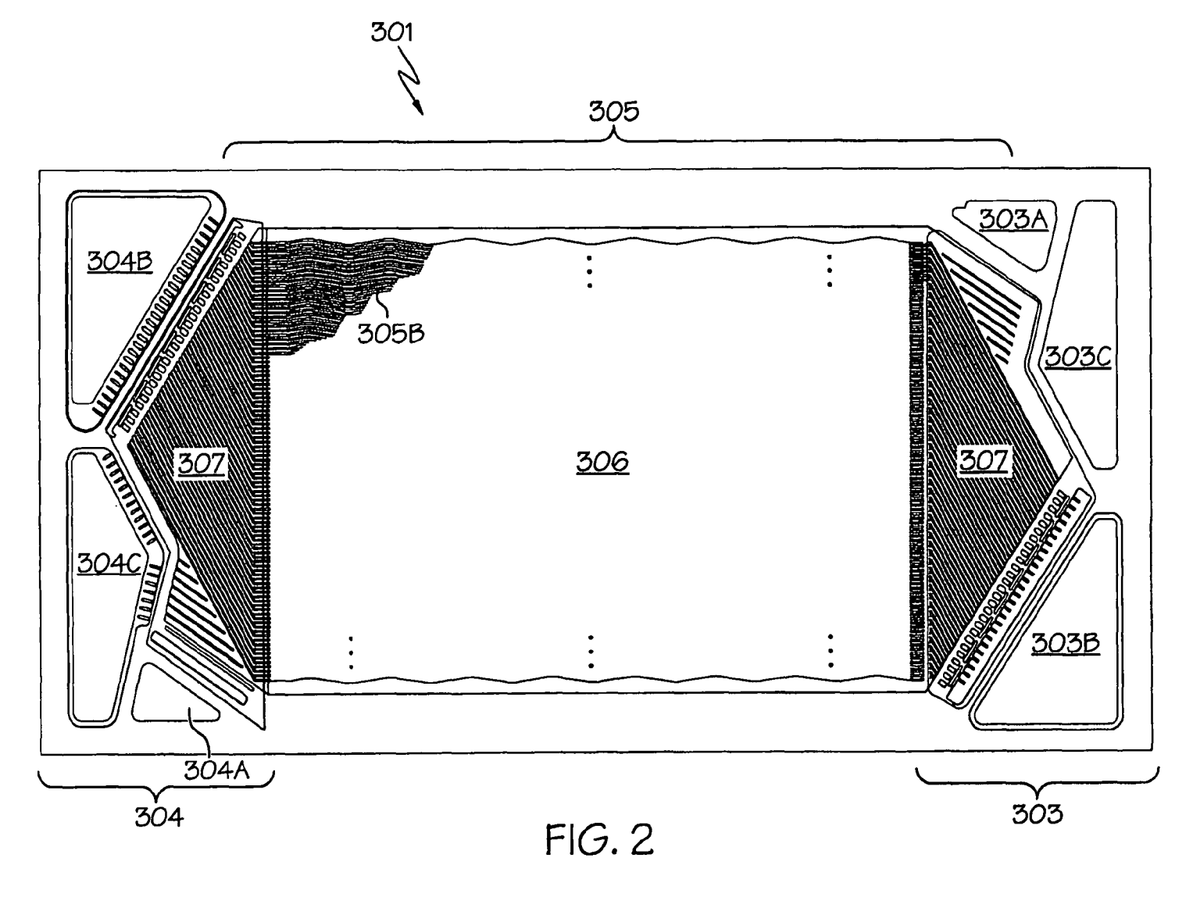
FIG. 2 shows a top view of a cathode side of a bipolar plate of a fuel cell with integrated water vapor transfer unit according to an embodiment of the present invention.

Referring with particularity to FIG. 2, various features of a cathode side of a bipolar plate (also referred to simply as "plate") 301 with a partial view of the various flow channels that make up flowpath 305 formed therein is shown. The present view depicts the side of the bipolar plate 301 that faces the cathode 330 (not presently shown), although it will be appreciated that the opposing side of the plate 301 is equally applicable to the discussion of how the present invention operates. In the present context, the term "flow channel" is used generally to encompass the various forms of flow channels that make up flowpath 305, including anode flow channels 305A, cathode flow channels 305B and optional coolant flow channels 305C. By way of example, a partial view of cathode flow channels 305B is shown. In an assembled fuel cell, individual MEAs (not shown) are overlaid on the bipolar plate 301 such that the flow channels formed between the plate 301 and the respective anode or cathode diffusion media facilitate the flow of a corresponding reactant. It will be appreciated by those skilled in the art that although the flowpath details of the plate 301 are for the cathode side of an otherwise conventional fuel cell, such configuration would be equally applicable to an anode (not presently shown). As is understood by those skilled in the art, the diffusion media of cathode 330 mates with one surface of plate 301, while the diffusion media of the anode 310 mates with the other opposing surface. A frame 302 is used to define the outer boundaries of the plate 301, and may include an upstanding lip or flange to increase plate sealing, rigidity or the like. The flow headers 303, 304 formed within the frame 302 surround on opposing side edges a flowpath 305 disposed between them. The headers 303, 304 define flow apertures therein to allow delivery of the appropriate reactants to their corresponding electrode within the bipolar plate, as well as an entire stack of plates when stacked together. Since the preferred direction of fluid movement in the anode and cathode flowpaths in plate 301 is counterflow, header 303 includes a cathode inlet manifold 303B and an anode outlet manifold 303A. An optional coolant manifold 303C is also shown. Similarly, header 304 includes a cathode outlet manifold 304B and an anode inlet manifold 304A. Coolant manifold 304C is fluidly coupled to coolant manifold 303C through a coolant flowpath (not shown) that extends from one header to the other. Similarly, an anode flowpath (not shown, but which may be made up of numerous individual flow channels placed side-by-side in a fashion known to those skilled in the art and similar to that shown for cathode flow channels 305B) extends between the two anode manifolds 303A, 304A to establish a flowpath for the hydrogen-bearing fluid.

The flowpath 305 includes an active region 306 and inactive regions (also referred to as the humidifier regions) 307 that together define a fluidly continuous conduit, piping or related flow channel through which the oxygen-bearing reactant passes. It will be appreciated that the active region 306 may include various bends, curves or related serpentine patterns formed by the individual flow channels, as is known in the art, as a way to increase flowpath length and related contact area. In the present context, the active region 306 is that portion of the flowpath 305 that would be overlaid with a diffusion media (which in turn is preferably overlaid with a catalyst) such that the electrochemical combination of the reactants produces electron flow, heat and water vapor. By contrast, the inactive region 307 is that portion of the flowpath 305 that does not include catalyst, but is instead used to provide water transfer capability between moisture-rich and moisture-deficient flowpaths. Thus, while ensuring a continuous flow of reactants between the active region 306 and the headers 303, 304, the inactive region 307 does nothing to contribute to the generation of electricity through an electrochemical reaction. By virtue of the formation of water as a byproduct of the reaction between hydrogen an oxygen at cathode 330, the cathode 330 is referred to as the "wet" end of fuel cell 300, while the anode 310 is referred to as the "dry" end. Consequently, the fluid flowing at the wet end has, in addition to oxygen, an elevated moisture content (for example, in the form of humidity), making it a moisture-rich fluid.

Figure 3:
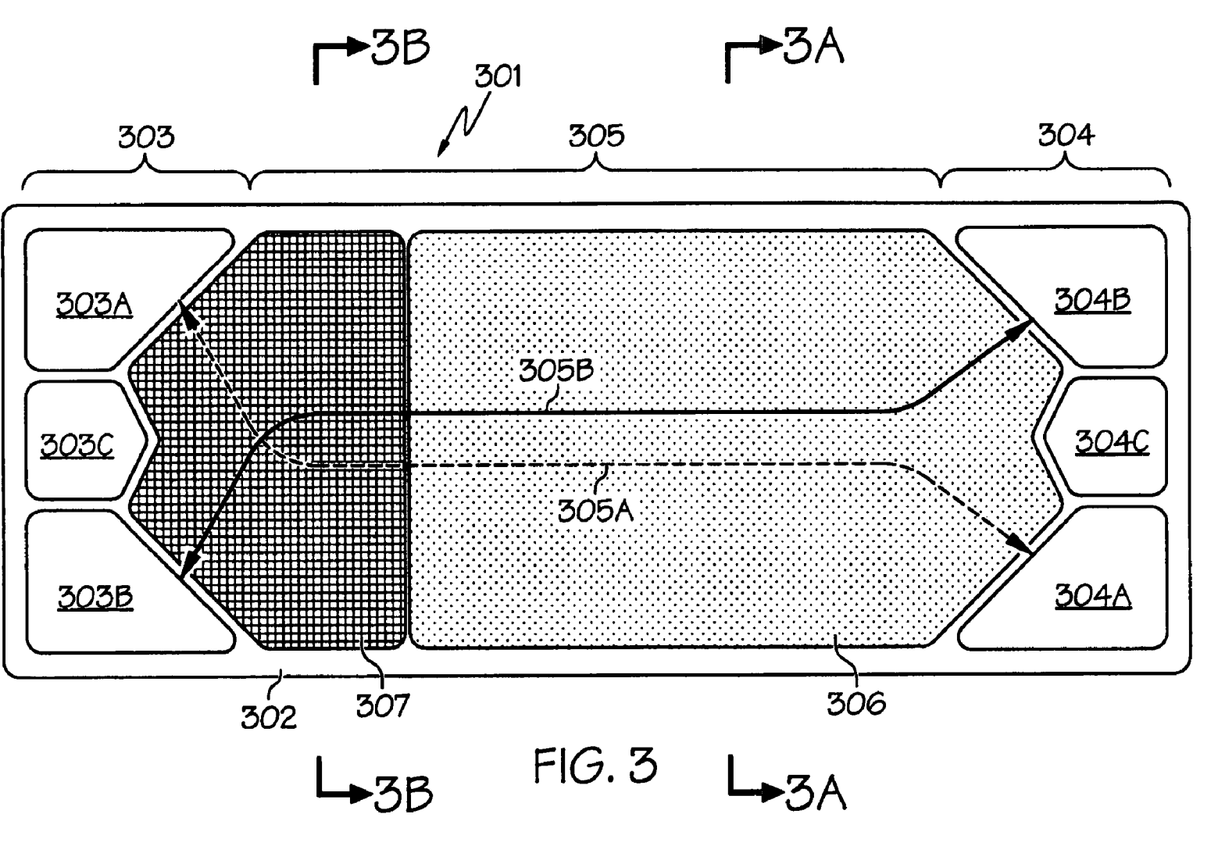
FIG. 3 shows an alternate embodiment of the bipolar plate of FIG. 2.
Figure 3A:
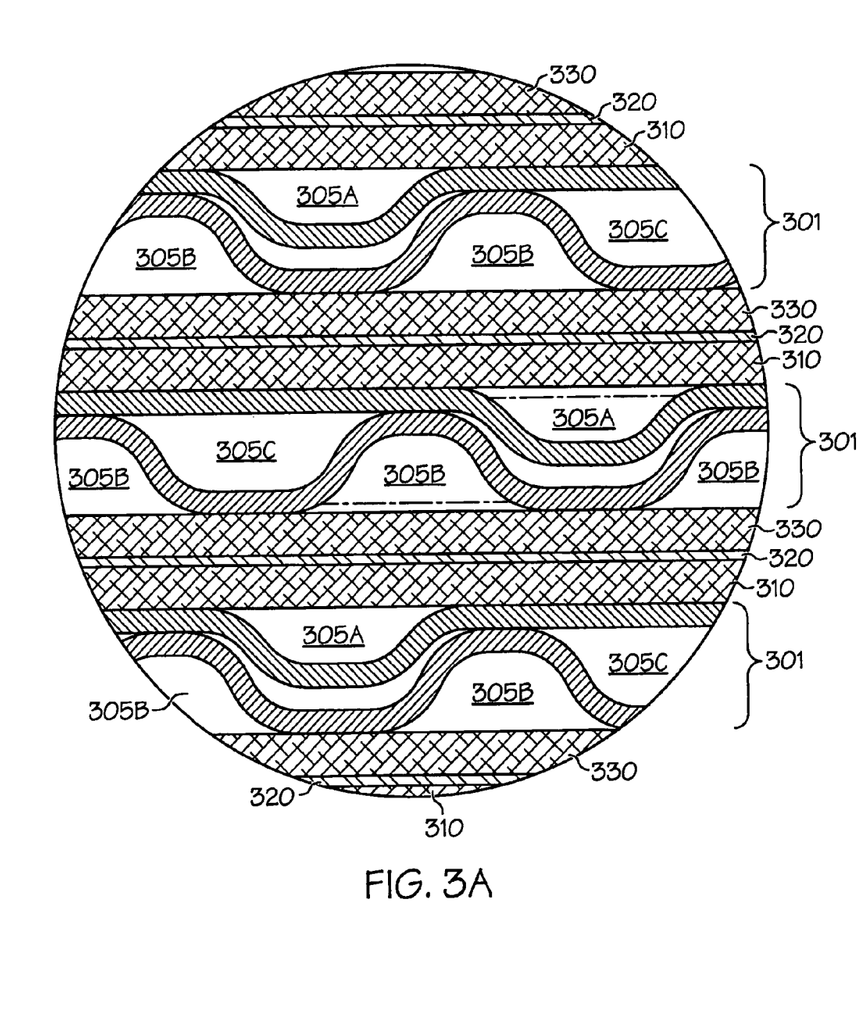
FIG. 3A shows a cross sectional view within the active region of the bipolar plate of FIG. 3.
Figure 3B:
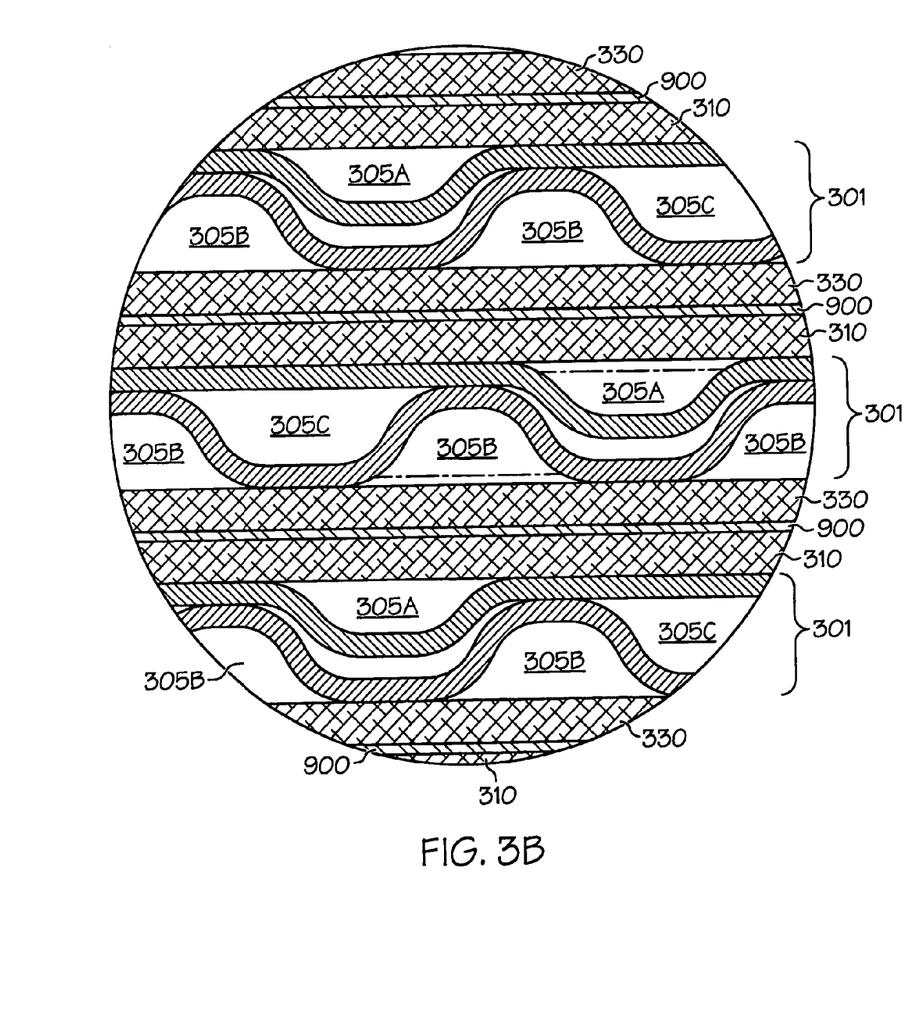
FIG. 3B shows a cross sectional view within the inactive region of the bipolar plate of FIG. 3.

Referring next to FIGS. 3, 3A and 3B, an alternate configuration of bipolar plate 301, showing how the inactive region 307 of flowpath 305 can be situated on one side of the cell such that it is adjacent one, rather than both, of the flow headers 303, 304. Referring with particularity to FIG. 3, the drawing shows an individual cathode flow channel 305B for the oxygen-bearing fluid that passes through cathode 330, as well as a dotted line to represent (on the other side of plate 301) the flow on an individual anode channel 305A of hydrogen-bearing fluid that starts at the anode inlet 304A in flow header 304 and extends to anode outlet 303A in flow header 303. Referring with particularity to FIGS. 3A and 3B, which are taken along various station lines of FIG. 3, cross sectional views showing the stacked nature of the bipolar plate 301 and the anode 310, cathode 330 and electrolyte (i.e., membrane) 320 shows the cooperation of the various flowpaths 305A, 305B and 305C. In FIG. 3A, which corresponds to the portion of the bipolar plate 301 that defines the active region 306, electrochemical reactions take place between the anode 310, cathode 330 and the electrolyte 320, as is well understood in the art. FIG. 3B is generally similar to FIG. 3A, except that by virtue of the fact that it corresponds to the portion of the bipolar plate 301 that defines the inactive region 307, the electrolyte 320 is replaced by a water transport unit 900 (discussed in more detail below). In this case, humidification takes place across the anode diffusion media. This media may include a hydrophilic layer, coating or construction to promote wicking or other humidification-enhancing behavior to the cathode inlet stream (described generally as a moisture-accepting fluid channel 920 below) using anode exhaust (described generally as a moisture-donating fluid channel 910 below). One especially preferred configuration would incorporate a recycle loop in the anode flowpath, as such a recirculation loop increases the humidity of the fluid flowing through the anode.

Figure 4A:
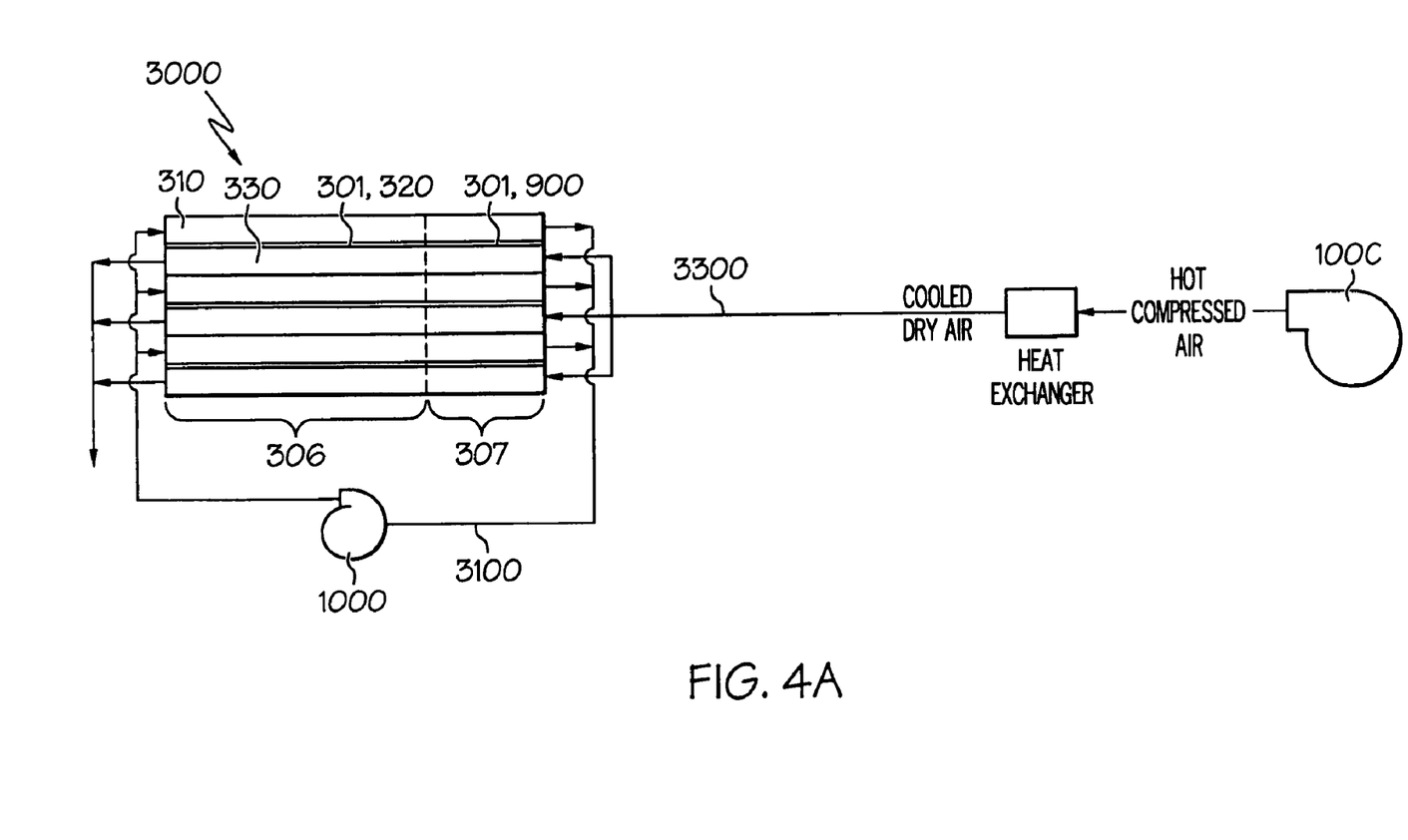
FIG. 4A shows a flow diagram of the cooperation between the water vapor transfer unit and at least one of the reactant flowpaths in the fuel cell of FIG. 2.

Referring next to FIG. 4A, a simplified block diagram depicting the formation of a water transport unit 900 into a fuel cell 300 and its bipolar plate 301 is shown. Unlike conventional approaches, where a humidification device would be placed away from the individual cells or the bipolar plates between individual MEAs, the juxtaposition of the water transport unit 900 and each fuel cell 300 and its companion bipolar plate 301 indicates the high degree on integration and concomitant space-saving. The present figure illustrates the humidification of a cathode stream 3300 in a fuel cell stack 3000. This embodiment is preferable when an anode stream 3100 is recycled using a pump 1000 or related device. The higher flow rates due to recycling brings more water to the anode side of the inactive (humidifier) region 307 of plate 301, thus increasing the humidification of the cathode stream 3300. Additionally, removal of liquid water from the anode stream 3100 reduces blockage and the concomitant possibility of hydrogen starvation in the active region 306 on the anode side of the plate 301. This is beneficial in reducing MEA degradation. To enhance the water removal from the recirculating anode stream 3100, a hydrophilic diffusion media on the anode side of the humidification region 307 of plate 301 would act as a wick and water buffer as the water is evaporated into the cathode stream 3300.

Figure 4B:
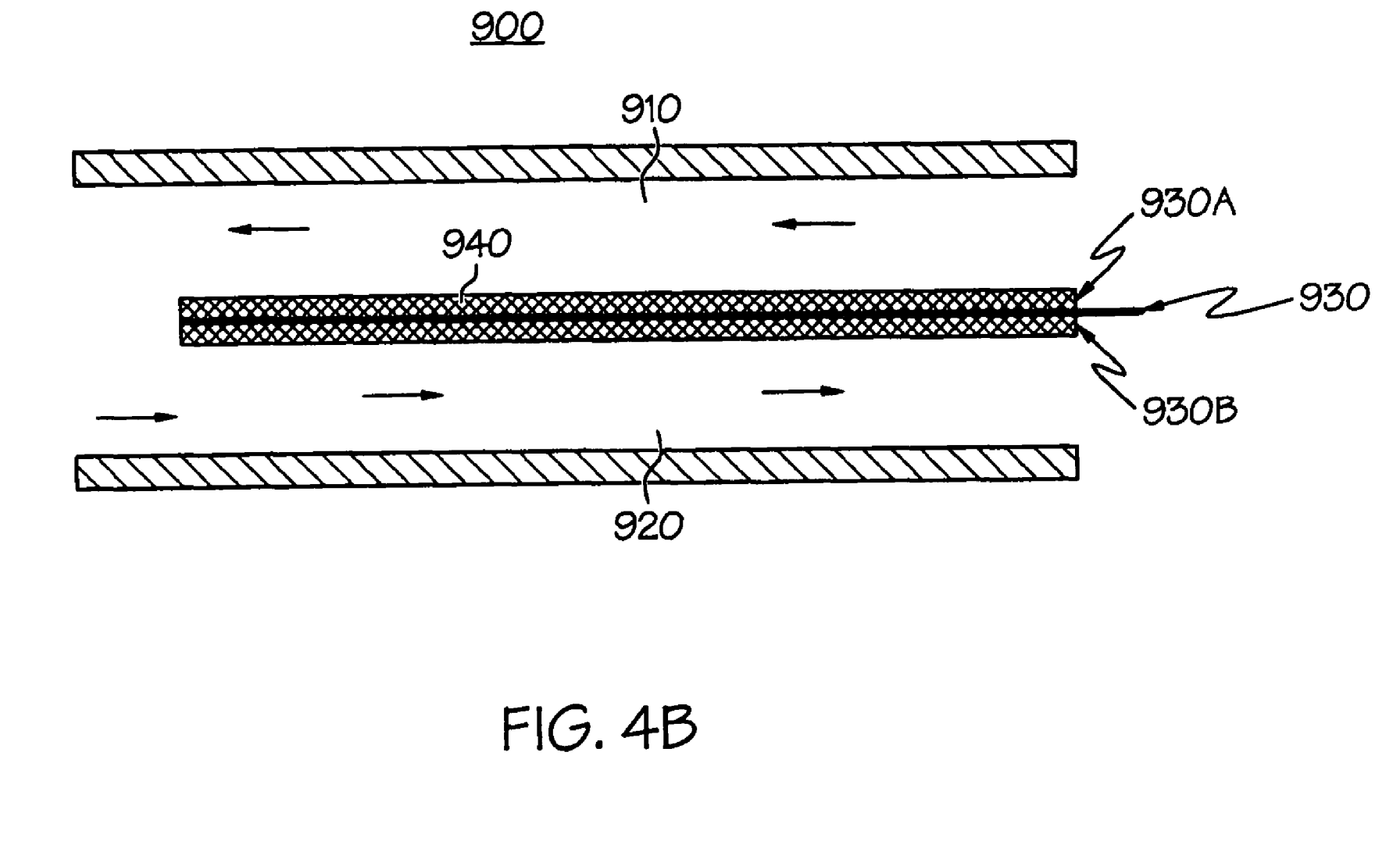
FIG. 4B shows the water vapor transfer unit of FIG. 4A in more detail.

Referring next to FIG. 4B, water transport unit (also referred to as a water vapor transfer unit or water transport unit) 900, to convey water vapor from a moisture-rich flowstream to a low moisture flowstream, is shown. The device 900 includes a moisture-donating fluid channel 910, a moisture-accepting fluid channel 920, a water transfer membrane 930 with first and second surfaces 930A and 930B and a diffusion media 940. The first surface 930A is exposed to the moisture-donating fluid, while the second surface 930B is exposed to the moisture-accepting fluid. In this way, the first surface 930A becomes the hydrophilic diffusion media, where it is inherently hydrophilic throughout it thickness by virtue of material properties or treatments. In a preferred (although not necessary) embodiment, it is the anode flowpath that is the moisture-donating fluid channel 910 that is adjacent the first surface 930A. The portion of diffusion media 940 on the moisture-accepting fluid channel 920 does not need to be hydrophilic. The hydrophilic diffusion media 940 on the moisture-donating side serves two beneficial functions. First, it pulls liquid water from the flow channels, keeping them free from blockage. Second, by holding liquid water against the water transfer membrane 930 it provides a more consistent supply of water to the moisture-accepting fluid channel 920, thereby acting as a water buffer. In other words, the buffer action can ensure more consistent humidification of fuel cell 300, as the tendency of the hydrophilic diffusion media 940 to store liquid water keeps the membrane 930 hydrated under fuel cell 300 operating conditions where periodic discharges of water may occur. In addition, some membrane materials show higher performance when liquid water is in contact with the side of the membrane 930 that faces (i.e., is adjacent) the moisture-donating fluid channel 910. While the water transport unit 900 works with a moisture-donating fluid in either the liquid or vapor form, membrane 930 generally works better when the water contained in the fluid is in liquid form. Moreover, the flexible porous construction of the hydrophilic diffusion media 940 is such that any water trapped in the moisture-donating fluid channel 910 of water transport unit 900 will wick to the layer during freeze conditions, which makes it resistant to freeze-thaw cycles. As shown, the two channels are in a counterflow relationship with one another such that the fluid in moisture-accepting fluid channel 920 enters the left side as shown with little or no humidity, and leaves on the right side with an increased level of humidity after having accepted water from the right-to-left flowing fluid in moisture-donating fluid channel 910. Although the water transport unit 900 is shown as a pair of generally rectangular film-like channels 910 and 920 with membrane 930 and diffusion media 940, it will be appreciated that the channels, membrane and diffusion media may be any of a variety of shapes. It will also be appreciated that the view shown in FIG. 4B is not to scale, and that spacing between the various elements therein are considerably smaller than indicated.

While certain representative embodiments and details have been shown for purposes of illustrating the invention, it will be apparent to those skilled in the art that various changes may be made without departing from the scope of the invention, which is defined in the appended claims.

What is claimed is:

1. A fuel cell assembly comprising:
a plurality of fuel cells arranged as a stack, each of said fuel cells comprising:
an anode configured to accept a hydrogen-bearing reactant;
a cathode configured to accept an oxygen-bearing reactant; and
a bipolar plate disposed between said anode and said cathode such that an anode flowpath and a cathode flowpath defined on opposing surfaces of said bipolar plate are configured such that a respective one of said hydrogen-bearing reactant and said oxygen-bearing reactant may be delivered to a corresponding one of said anode and said cathode, said anode flowpath and said cathode flowpath arranged such that at least a portion of a travel distance therealong defines:
an active region formed along a portion of a surface of said bipolar plate, said active region adjacent a respective one of said anode and said cathode to facilitate a catalytic reaction therebetween, and
an inactive region formed along a portion of said surface of said bipolar plate that is spaced away from said active region, said inactive region configured such that a catalytic reaction does not take place therein; and
a water transport unit placed between an adjacently stacked anode and cathode within at least said inactive region such that they are in moisture exchange communication with one another, said water transport unit comprising:
a moisture-donating fluid channel configured to receive flow from at least one moisture-rich flowpath in said bipolar plate that corresponds to one of said adjacently stacked anode or cathode; and
a moisture-accepting fluid channel configured to deliver flow to the other of said flowpath in said bipolar plate that corresponds to said anode or said cathode, said moisture-accepting fluid channel cooperative with said moisture-donating fluid channel such that upon passage of a moisture-donating fluid through the latter, at least some of the water contained therein passes to the former, wherein said moisture-donating fluid channel and said moisture-accepting fluid channel are separated by a moisture-permeable membrane, and wherein at least one side of said moisture-permeable membrane is substantially covered with a hydrophilic diffusion media.

2. The assembly of claim 1, wherein said active region defines a substantial center of said at least one fuel cell.

3. The assembly of claim 1, further comprising a plurality of flow headers, each of which are disposed at opposing ends of said plurality of flowpaths and define manifolds therefor.

4. The assembly of claim 1, further comprising at least one coolant flowpath placed in thermal communication with at least one of said anode and said cathode.

5. The assembly of claim 1, wherein said moisture-donating fluid channel and said moisture-accepting fluid channel are arranged in substantial counterflow relationship with one another.

6. The assembly of claim 1, wherein said moisture-donating fluid channel is fluidly coupled to said portion of flowpaths that are in fluid communication with said cathode such that an exhaust fluid produced by said electrochemical reaction can flow through said moisture-donating fluid channel in order to give up at least a portion of the water contained in said exhaust fluid to said moisture-accepting fluid channel.

7. The assembly of claim 6, wherein said moisture-accepting fluid channel is fluidly coupled to said portion of flowpaths that are in fluid communication with said anode such that upon receipt of said portion of the water from said moisture-donating fluid channel, said portion of flowpaths that are in fluid communication with said anode can convey said hydrogen-bearing fluid and said portion of the water to said anode.

8. The assembly of claim 6, wherein said moisture-rich flowpath is a cathode exhaust, and said portion of said fuel cell that is in need of humidification is an anode inlet.

9. The assembly of claim 6, wherein said moisture-rich flowpath is a cathode exhaust, and said portion of said fuel cell that is in need of humidification is a membrane that is disposed between said anode and said cathode flow channels.

10. The assembly of claim 6, further comprising an anode recirculation loop fluidly coupled to said anode.

11. The assembly of claim 1, wherein said moisture-donating fluid channel is common with said at least one moisture-rich flowpath.

12. A vehicle comprising the fuel cell assembly of claim 1, wherein said fuel cell assembly serves as a source of motive power for a vehicle.

* * * * *